(12) United States Patent
Yanagisawa et al.

(10) Patent No.: US 11,088,378 B2
(45) Date of Patent: Aug. 10, 2021

(54) METHOD AND APPARATUS FOR MANUFACTURING MEMBRANE ELECTRODE ASSEMBLY

(71) Applicant: HONDA MOTOR CO., LTD., Tokyo (JP)

(72) Inventors: Kunihiko Yanagisawa, Tochigi (JP); Takahiro Hirano, Tochigi (JP); Masaaki Kishimoto, Tochigi (JP); Yoshinori Tokunaga, Tochigi (JP); Hiroyuki Nakatsuka, Tochigi (JP); Yo Shimomura, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 89 days.

(21) Appl. No.: 16/366,519

(22) Filed: Mar. 27, 2019

(65) Prior Publication Data

US 2019/0305349 A1     Oct. 3, 2019

(30) Foreign Application Priority Data

Mar. 30, 2018   (JP) .............................. JP2018-067151

(51) Int. Cl.
| | |
|---|---|
| *H01M 4/04* | (2006.01) |
| *H01M 8/1004* | (2016.01) |
| *B32B 43/00* | (2006.01) |
| *H01M 4/88* | (2006.01) |
| *B29C 39/20* | (2006.01) |

(52) U.S. Cl.
CPC ......... *H01M 8/1004* (2013.01); *B32B 43/006* (2013.01); *H01M 4/0407* (2013.01); *H01M 4/8878* (2013.01); *B29C 39/203* (2013.01); *B32B 2457/18* (2013.01)

(58) Field of Classification Search
CPC . H01M 8/0407; B32B 2457/18; B29C 39/203
See application file for complete search history.

(56) References Cited

U.S. PATENT DOCUMENTS 7,740,728 B2 *    6/2010  Ametani ........... H01L 21/67132
                                                156/228
2013/0306237 A1 * 11/2013 Nagasaka ............ H01M 8/0271
                                                156/285

FOREIGN PATENT DOCUMENTS

JP        2010-205676       9/2010

* cited by examiner

*Primary Examiner* — Jeremiah R Smith
(74) *Attorney, Agent, or Firm* — Rankin, Hill & Clark LLP

(57) ABSTRACT

A method and apparatus for manufacturing a membrane electrode assembly are provided, which can efficiently peel an electrode layer from a base material. A manufacturing apparatus for manufacturing a membrane electrode assembly of a fuel cell including a pair of electrode layers and an electrolyte membrane, the apparatus including: a transport device which transports the base material on which one cathode electrode layer of the pair of electrode layers is formed and which is connected to a transport sheet via an adhesive layer together with the transport sheet; a transfer device which transfers the one cathode electrode layer to the electrolyte membrane; a peeling device which peels the cathode electrode layer from the base material; and a cooling device having a spraying device which is directed to a start point portion for the peeling and sprays a cooling gas.

4 Claims, 4 Drawing Sheets

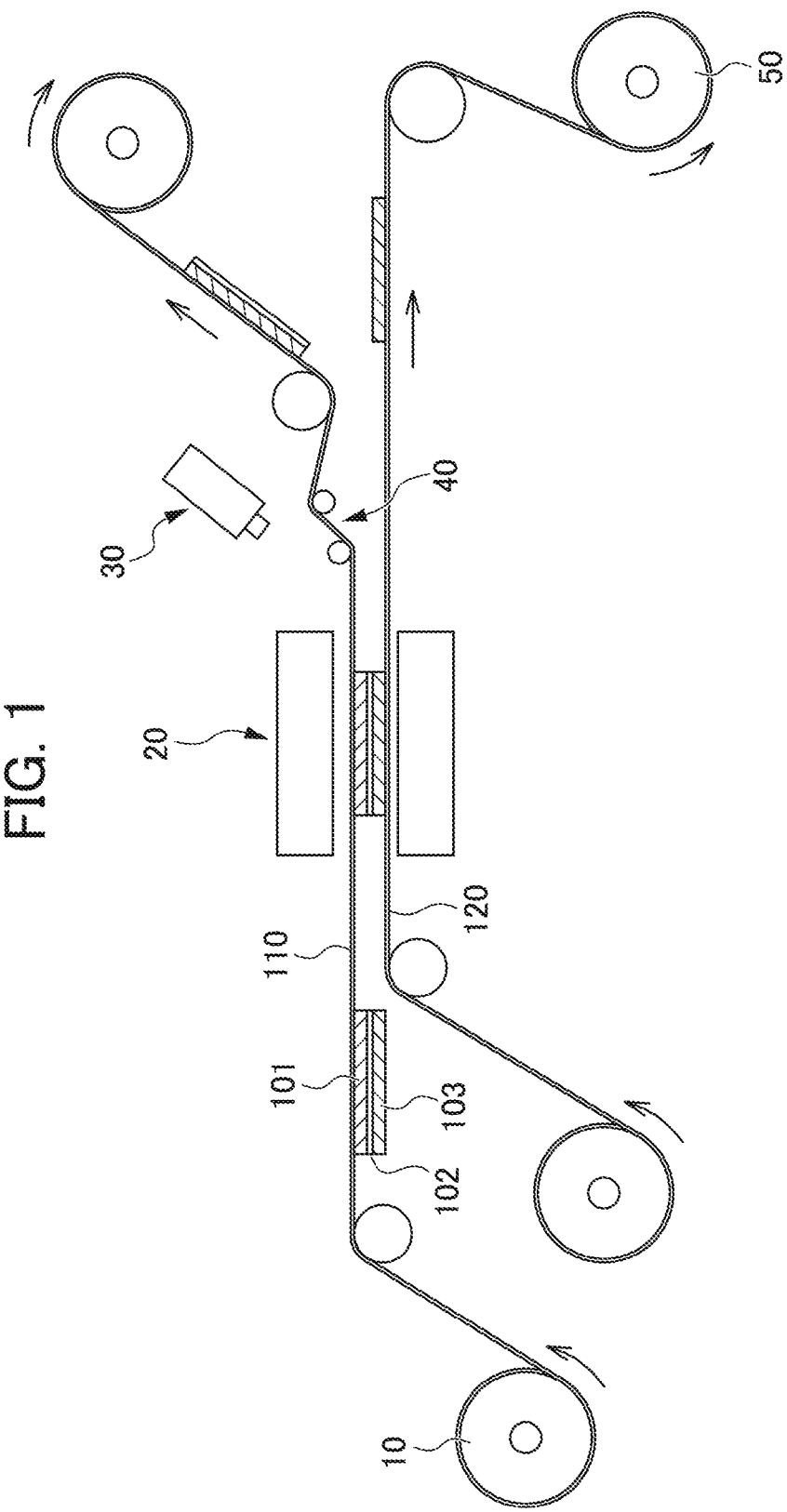

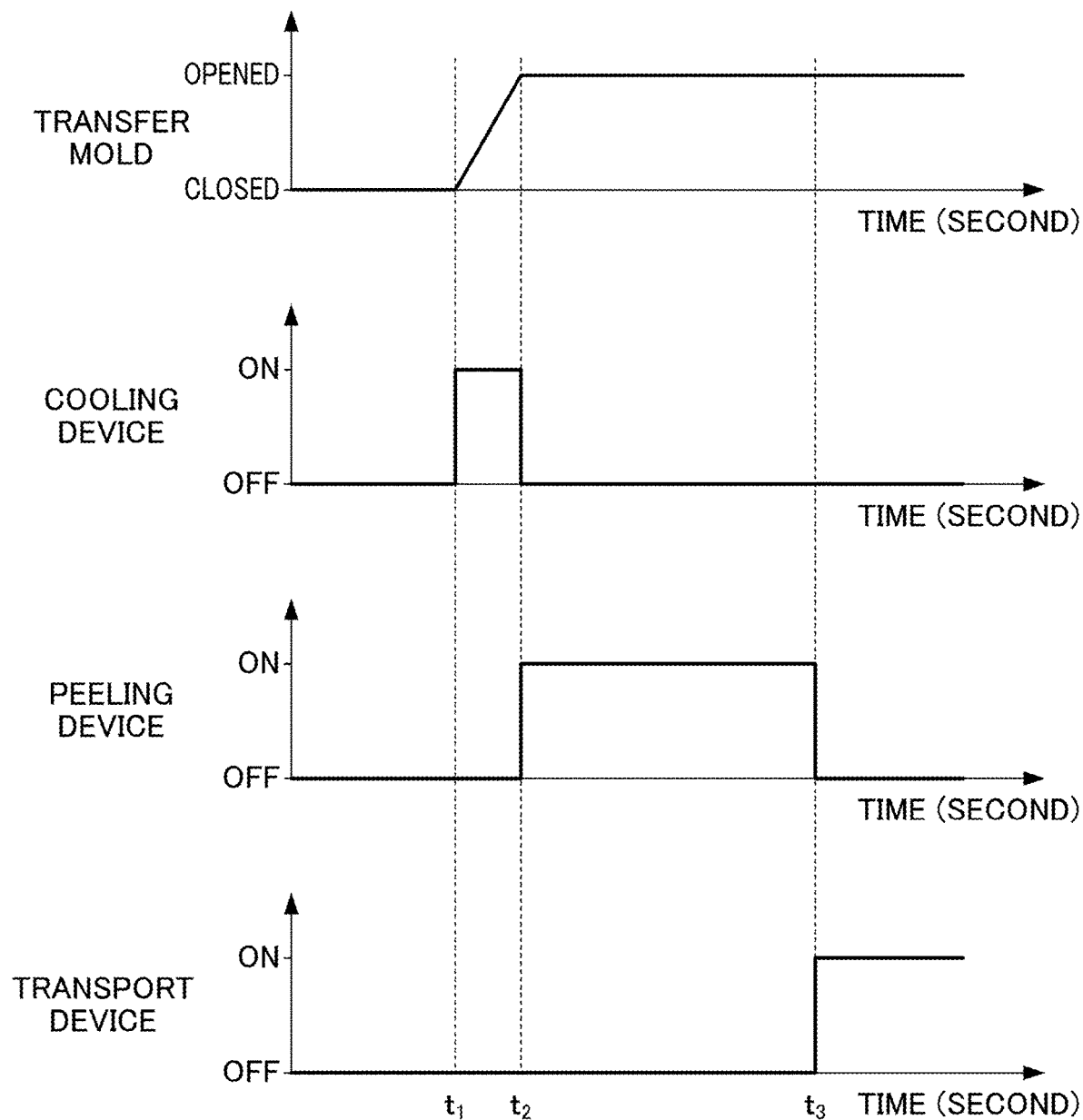

METHOD AND APPARATUS FOR MANUFACTURING MEMBRANE ELECTRODE ASSEMBLY

This application is based on and claims the benefit of priority from Japanese Patent Application No. 2018-067151, filed on 30 Mar. 2018, the content of which is incorporated herein by reference.

BACKGROUND OF THE INVENTION

Field of the Invention

The present invention relates to a method and apparatus for manufacturing a membrane electrode assembly of a fuel cell.

Related Art

As a power source of an automobile, there have been put to practical use an engine using gasoline or the like as a fuel, a motor driven by electricity, and a combination of the engine and the motor. In recent years, from the viewpoint of environmental consideration, fuel-cell vehicles in which a motor is driven with electricity generated by a fuel cell have attracted much attention. A fuel cell supplies air and hydrogen to a membrane electrode assembly in which an anode electrode and a cathode electrode interpose an electrolyte membrane to generate electric energy and water.

As a method for manufacturing a membrane electrode assembly to be adopted in such a fuel cell, there has been proposed a technique for manufacturing a membrane electrode assembly by transferring an electrode layer to an electrolyte membrane by thermocompression bonding a surface on the electrode layer side of a transport sheet having the electrode layer on the base material and the electrolyte membrane and peeling the transport sheet and the base material from the electrode layer (refer to, for example, Patent Document 1).

However, if the temperature of the base material is increased by thermocompression bonding, the adhesive force between the transport sheet and the base material is decreased. For this reason, if peeling is performed without cooling the base material, there is a problem in that the transport sheet and the base material are integrated not to be peeled, so that the electrode layer remains on the base material. According to the technique described in Patent Document 1, the problem is solved by cooling the base material before the peeling by a cooling mechanism.

Patent Document 1: Japanese Unexamined Patent Application, Publication No. 2010-205676

SUMMARY OF THE INVENTION

However, in Patent Document 1, there is disclosed only a configuration that only the entire base material, and more particularly, only the entire transport sheet is cooled. For this reason, a more efficient cooling method is required.

The present invention is to provide a method and apparatus for manufacturing a membrane electrode assembly capable of efficiently peeling an electrode layer from a base material.

(1) According to the present invention, there is provided a method for manufacturing a membrane electrode assembly of a fuel cell including a pair of electrode layers and an electrolyte membrane (for example, an electrolyte membrane 120 to be described later), the method including: a transport step of transporting a base material (for example, a base material 102 to be described later) connected to a transport sheet (for example, a transport sheet 110 to be described later) via an adhesive layer (for example, an adhesive layer 101 to be described later) and having one electrode layer (for example, a cathode electrode layer 103 described later) of the pair of electrode layers formed on a surface opposite to the adhesive layer together with the transport sheet; a transfer step of transferring the one electrode layer to the electrolyte membrane; and a peeling step of peeling the one electrode layer from the base material, in which a cooling step of performing cooling by spraying a cooling gas to a start point portion for the peeling (for example, a start point portion 105 for the peeling to be described later) is included between the transfer step and the peeling step.

(2) In the method for manufacturing a membrane electrode assembly according to (1), in the transfer step, the one electrode layer may be transferred to the electrolyte membrane by closing a transfer mold (for example, a transfer mold 21 to be described later), and in the cooling step, the spraying of the cooling gas may be started when the transfer mold starts to be opened.

(3) In the method for manufacturing a membrane electrode assembly according to (2), in the cooling step, the spraying of the cooling gas may be stopped when the transfer mold is completely opened.

(4) In the method for manufacturing a membrane electrode assembly according to any one of (1) to (3), in the peeling step, the one electrode layer may be peeled from the base material by rollers (for example, a first peeling roll 41 and a second peeling roll 42 to be described later) moving between the base material and the one electrode layer from a downstream side toward an upstream side in a transport direction.

(5) In addition, according to the present invention, there is provided an apparatus (for example, manufacturing apparatus 1 to be described later) for manufacturing a membrane electrode assembly of a fuel cell including a pair of electrode layers and an electrolyte membrane (for example, an electrolyte membrane 120 to be described later), the apparatus including: a transport device (for example, a transport device 10 to be described later) which transports a base material (for example, a base material 102 to be described later) connected to a transport sheet via an adhesive layer (for example, an adhesive layer 101 to be described later) and having one electrode layer (for example, a cathode electrode layer 103 to be described later) of the pair of electrode layers formed on a surface opposite to the adhesive layer together with the transport sheet; a transfer device (for example, a transfer device 20 to be described later) which transfers the one electrode layer to the electrolyte membrane; a peeling device (for example, a peeling device 40 to be described later) which peels the one electrode layer from the base material; and a cooling device (for example, a cooling device 30 to be described later) having a spraying device (for example, a spraying device 31 to be described later) which is directed to a start point portion for the peeling (for example, a start point portion 105 for the peeling to be described later) and sprays a cooling gas.

(6) The apparatus for manufacturing a membrane electrode assembly according to (5) may further include a control device (for example, a control device 32 to be described later) which controls a timing at which the spraying device sprays the cooling gas, in which the transfer device may transfer the one electrode layer to the electrolyte membrane by closing a transfer mold (for example, a transfer mold 21 to be described later), and the control device may start the spraying of the cooling gas when the transfer mold starts to be opened.

(7) In the apparatus for manufacturing a membrane electrode assembly according to (5) or (6), the peeling device may include rollers (for example, a first peeling roll 41 and a second peeling roll 42 to be described later) for peeling the one electrode layer from the base material by moving between the base material and the one electrode layer from a downstream side toward an upstream side in a transport direction.

(1) According to the present invention, there is provided a method for manufacturing a membrane electrode assembly of a fuel cell including a pair of electrode layers and an electrolyte membrane, the method including: a transport step of transporting a base material connected to a transport sheet via an adhesive layer and having one electrode layer of the pair of electrode layers formed on a surface opposite to the adhesive layer together with the transport sheet; a transfer step of transferring the one electrode layer to the electrolyte membrane; and a peeling step of peeling the one electrode layer from the base material, in which a cooling step of performing cooling by spraying a cooling gas to a start point portion for the peeling is included between the transfer step and the peeling step. According to the invention of (1), by spraying the cooling gas to the start point portion for the peeling, the adhesive layer is sufficiently cured, and thus, a strong adhesive force between the base material and the transport sheet can be obtained. Accordingly, the electrode layer can be peeled continuously from the base material by using the start point portion for the peeling as a start point. In addition, the electrode layer can be efficiently peeled from the base material only by cooling the start point portion for the peeling.

(2) In the method for manufacturing a membrane electrode assembly according to (1), in the transfer step, the one electrode layer is transferred to the electrolyte membrane by closing a transfer mold, and in the cooling step, the spraying of the cooling gas is started when the transfer mold starts to be opened. According to the invention of (2), when the transfer mold starts to be opened, the cooling of the start point portion for the peeling is started, so that the start point portion for the peeling can be efficiently cooled.

(3) In the method for manufacturing a membrane electrode assembly according to (2), in the cooling step, the spraying of the cooling gas is stopped when the transfer mold is completely opened. According to the invention of (3), since the spraying of the cooling gas is stopped when the transfer mold is completely opened, it is possible to proceed to the peeling step immediately after the transfer step. That is, since there is no loss of time due to the cooling step, the electrode layer can be more efficiently peeled from the base material. In addition, by limiting a spraying time, it is possible to minimize the temperature effect of the mold.

(4) In the method for manufacturing a membrane electrode assembly according to any one of (1) to (3), in the peeling step, the one electrode layer is peeled from the base material by rollers moving between the base material and the one electrode layer from a downstream side toward an upstream side in a transport direction. According to the invention of (4), since the rollers moves to perform the peeling step, the electrode layer can be more efficiently peeled from the base material.

(5) In addition, according to the present invention, there is provided an apparatus for manufacturing a membrane electrode assembly of a fuel cell including a pair of electrode layers and an electrolyte membrane, the apparatus including: a transport device which transports a base material connected to a transport sheet via an adhesive layer and having one electrode layer of the pair of electrode layers formed on a surface opposite to the adhesive layer together with the transport sheet; a transfer device which transfers the one electrode layer to the electrolyte membrane; a peeling device which peels the one electrode layer from the base material; and a cooling device having a spraying device which is directed to a start point portion for the peeling and sprays a cooling gas. Since the apparatus for manufacturing a membrane electrode assembly according to the present invention is an invention of an apparatus based on the invention of the method for manufacturing a membrane electrode assembly according to (1) described above, substantially the same effects as those of the method for manufacturing a membrane electrode assembly can be obtained.

(6) The apparatus for manufacturing a membrane electrode assembly according to (5) further includes a control device which controls a timing at which the spraying device sprays the cooling gas, in which the transfer device transfers the one electrode layer to the electrolyte membrane by closing a transfer mold, and the control device starts the spraying of the cooling gas when the transfer mold starts to be opened. Since the apparatus for manufacturing a membrane electrode assembly according to the present invention is an invention of an apparatus based on the invention of the method for manufacturing a membrane electrode assembly according to (2) described above, substantially the same effects as those of the method for manufacturing a membrane electrode assembly can be obtained.

(7) In the apparatus for manufacturing a membrane electrode assembly according to (5) or (6), the peeling device includes rollers for peeling the one electrode layer from the base material by moving between the base material and the one electrode layer from a downstream side toward an upstream side in a transport direction. Since the apparatus for manufacturing a membrane electrode assembly according to the present invention is an invention of an apparatus based on the invention of the method for manufacturing a membrane electrode assembly according to (4) described above, substantially the same effects as those of the method for manufacturing a membrane electrode assembly can be obtained.

BRIEF DESCRIPTION OF THE DRAWINGS

FIG. 1 is an overall configuration diagram of an apparatus for manufacturing a membrane electrode assembly according to an embodiment of the present invention.

FIG. 4 is a time chart of the transfer step, the cooling step, and the peeling step of the method for manufacturing a membrane electrode assembly according to an embodiment of the present invention.

DETAILED DESCRIPTION OF THE INVENTION

Figure 2A:
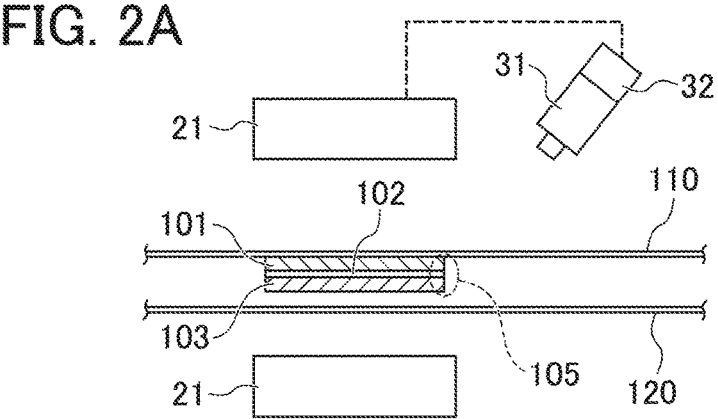
FIGS. 2A to 2D are schematic diagrams for describing a transfer step and a cooling step of a method for manufacturing a membrane electrode assembly according to an embodiment of the present invention.
Figure 2B:
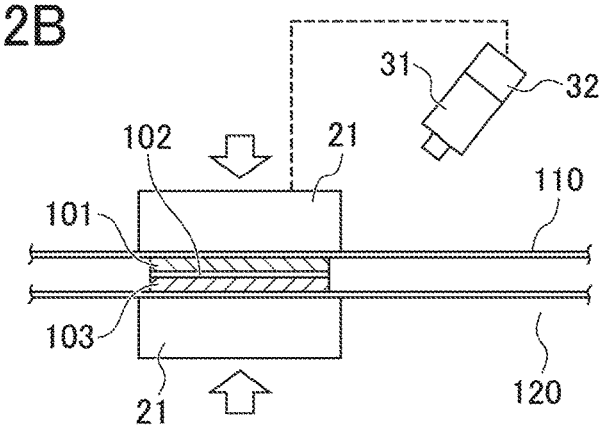

Hereinafter, an apparatus for manufacturing a membrane electrode assembly according to an embodiment of the present invention will be described in detail with reference to the drawings. FIG. 1 is an overall configuration diagram of the apparatus for manufacturing a membrane electrode assembly according to the embodiment. FIGS. 2A to 2D are schematic diagrams for describing a transfer step and a cooling step of a method for manufacturing a membrane electrode assembly according to an embodiment of the present invention, and FIGS. 3A to 3D are schematic diagrams describing a peeling step of the method for manufacturing a membrane electrode assembly according to an embodiment of the present invention. FIG. 4 is a time chart of the transfer step, the cooling step, and the peeling step of the method for manufacturing a membrane electrode assembly according to an embodiment of the present invention.

A manufacturing apparatus 1 according to the embodiment is an apparatus for manufacturing a membrane electrode assembly of a fuel cell including a pair of electrode layers and an electrolyte membrane. As illustrated in FIG. 1, the manufacturing apparatus 1 for manufacturing a membrane electrode assembly includes a transport device 10, a transfer device 20, a cooling device 30, a peeling device 40, and an electrolyte membrane transport device 50.

The transport device 10 is a device which transports a base material 102 together with a transport sheet 110. In the embodiment, the transport device 10 is a device which transports the base material 102 on which a cathode electrode layer 103 is formed. The transport device 10 transports the base material 102 together with the transport sheet 110 toward a downstream side in a transport direction (toward the transfer device 20). In addition, in the following description, a surface of the transport sheet 110 on the base material side is also referred to as a "surface of the transport sheet 110", and a surface opposite to the surface of the transport sheet 110 is also referred to as a "back surface of the transport sheet 110".

The base material 102 is connected to the transport sheet 110 via the adhesive layer 101. In addition, a cathode electrode layer 103 is formed on a surface of the base material 102 opposite to the adhesive layer 101.

As the adhesive layer 101, for example, an adhesive layer obtained by curing an adhesive such as a UV curable resin or an electron beam curable resin can be used. As a means for applying an adhesive to the transport sheet 110, for example, a dispenser, various inkjets, a roll coater, a die coater, a gravure coater, a screen printing machine, or the like can be used.

As the base material 102, a base material obtained by molding, for example, polyethylene terephthalate (PET), polyamide (nylon), polyimide (PI), polyethylene naphthalate (PEN), polytetrafluoroethylene (PTFE), or an ethylene tetrafluoroethylene copolymer (ETFE) in a film shape, or the like can be used. An easily-obtainable material such as polyethylene terephthalate is preferable from the point of view of cost and handling, and a fluorine-based polymer material such as polytetrafluoroethylene is preferable from the point of view of peelability. In addition, a material obtained by coating a peelable material on a surface of polyethylene terephthalate to improve the peelability may be used for the base material 102.

As the transport sheet 110, a transport sheet obtained by molding, for example, polyethylene terephthalate (PET), polyether imide (PEI), polyarylate (PAR), polysulfone (PSF), polyether sulfone (PES), polybutylene terephthalate (PBT), polyether ether ketone (PEEK), polyvinyl chloride (PVC), polyvinylidene chloride (PVDC), polytetrafluoroethylene (PTFE), or an ethylene tetrafluoroethylene copolymer (ETFE) in a film shape, a transport sheet obtained by appropriately adding a reinforcing material added to the aforementioned various types of films, or the like can be used.

The transfer device 20 is a device which transfers the cathode electrode layer 103 to an electrolyte membrane 120. In the embodiment, the transfer device 20 has a transfer mold 21. By closing the transfer mold 21, the cathode electrode layer 103 is transferred to the sheet-shaped electrolyte membrane 120.

Specifically, the base material 102 is transported into the transfer mold 21 in an opened state by the transport device 10 (refer to FIG. 2A). Then, the transport device 10 is stopped, the transfer mold 21 is closed, and the cathode electrode layer 103 is heated and pressed for t1 second in the state of being interposed between the electrolyte membrane 120 and the transport sheet 110 (refer to FIGS. 2B and 4). Accordingly, the cathode electrode layer 103 is transferred to the electrolyte membrane 120.

The transfer condition varies depending on the materials and the like of the adhesive layer 101, the base material 102, the cathode electrode layer 103, and the transport sheet 110. However, it is preferable that the transferring is performed, for example, at 100 to 200° C. and 1.7 to 5 MPa.

Figure 2C:
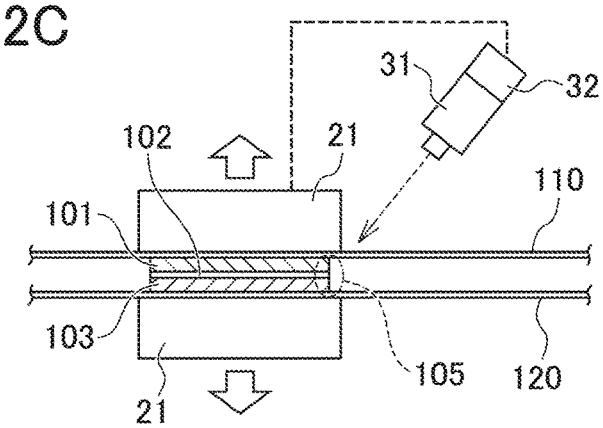

Subsequently, the transfer mold 21 is opened, and a state in which the cathode electrode layer 103 is heated and pressed is released (refer to FIGS. 2C and 4). Herein, the time (t2−t1) from the start of opening of the transfer mold 21 in the closed state to the end of opening thereof is 1 to 10 seconds. In addition, immediately after the transfer mold 21 is opened, the cathode electrode layer 103 is transferred to the electrolyte membrane 120 and is also connected to the transport sheet 110 via the base material 102 and the adhesive layer 101 (refer to FIG. 2D). In addition, in the embodiment, the transport device 10 is stopped for a time period after the transfer mold 21 is closed until the transfer mold 21 is completely opened.

The cooling device 30 has a spraying device 31 disposed between the transfer device 20 and the peeling device 40. In the embodiment, the cooling device 30 includes the spraying device 31 and a control device 32.

The spraying device 31 is a device which is directed to a start point portion 105 for the peeling (a portion of the base material 102 on the downstream side) and sprays a cooling gas. The control device 32 controls the timing at which the spraying device 31 sprays the cooling gas. The control device 32 is electrically connected to the transfer device 20 (transfer mold 21).

Figure 2D:
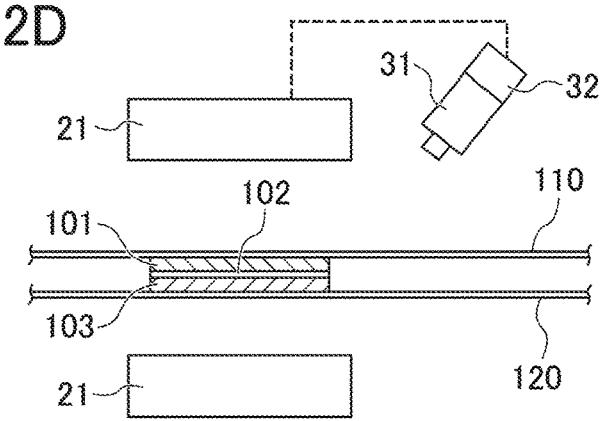

The control device 32 controls the timing at which the spraying device 31 sprays the cooling gas such that the spraying device 31 starts spraying of the cooling gas when the transfer mold 21 starts to be opened, that is, after t1 second from the time when the transfer mold 21 is closed (refer to FIGS. 2C and 4) and the spraying device 31 stops spraying of the cooling gas when the opening of the transfer mold 21 is ended (the transfer mold is completely opened), that is, after t2 seconds from the time when the transfer mold 21 is closed (refer to FIGS. 2D and 4). In other words, the time period from the start of opening of the closed transfer mold 21 to the end of opening thereof coincides with the timing at which the spraying device 31 sprays the cooling gas to the start point portion 105 for the peeling.

As described above, in the embodiment, since the transport device 10 is stopped for a time period after the transfer mold 21 is closed until the transfer mold 21 is completely opened, and thus, the base material 102 does not move in the transport direction during the time period in which the spraying device 31 sprays the cooling gas to the start point portion 105 for the peeling. Accordingly, without occurrence of a deviation from the directed position, the start point portion 105 for the peeling can be reliably cooled even for a short time period.

The cooling condition varies depending on the materials and the like of the adhesive layer 101, the base material 102, the cathode electrode layer 103, and the transport sheet 110. However, it is preferable that the temperature, the wind speed, and the like of the cooling gas are set such that the temperature of the start point portion 105 for the peeling is, for example, 120° C. or less in the cooling. In addition, the wind speed of the cooling gas is preferably 5 m/sec or more.

The peeling device 40 is a device which peels the cathode electrode layer 103 from the base material 102. In the embodiment, the peeling device 40 includes a first peeling roll 41 and a second peeling roll 42.

The first peeling roll 41 and the second peeling roll 42 are rollers moving from the downstream side toward an upstream side in the transport direction.

Each of the first peeling roll 41 and the second peeling roll 42 is a column-shaped member extending perpendicularly to the transport direction. The first peeling roll 41 is disposed closer to the upstream side in the transport direction (the side of the start point portion 105 for the peeling) than to the second peeling roll 42 and is in contact with the back surface of the transport sheet 110. The second peeling roll 42 is disposed closer to the downstream side in the transport direction than to the first peeling roll 41 and is in contact with the surface of the transport sheet 110. In addition, the central axis of the second peeling roll 42 is deviated closer to the back surface side in the transport direction than to the central axis of the first peeling roll 41.

Figure 3A:
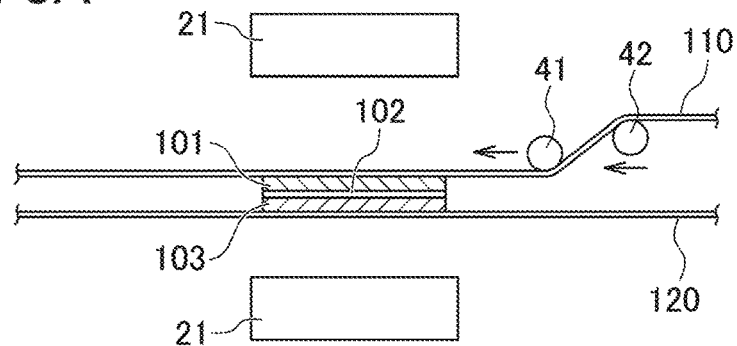
FIGS. 3A to 3D are schematic diagrams for describing a peeling step of the method for manufacturing a membrane electrode assembly according to an embodiment of the present invention.

When the transfer mold 21 is completely opened (that is, after t2 seconds from the time when the transfer mold 21 is closed), the first peeling roll 41 and the second peeling roll 42 move from the downstream side toward the upstream side in the transport direction (refer to FIG. 3A). When the first peeling roll 41 passes through the back surface of the portion where the start point portion 105 for the peeling of the transport sheet 110 is disposed, the start point portion 105 for the peeling is pulled toward the transport sheet 110 side and the electrolyte membrane 120 side, respectively. Herein, since the start point portion 105 for the peeling is cooled, the strength of the adhesive layer 101 exceeds the strength of the interface between the base material 102 and the cathode electrode layer 103. For this reason, the base material 102 and the cathode electrode layer 103 are peeled from the start point portion 105 for the peeling as a start point.

Figure 3B:
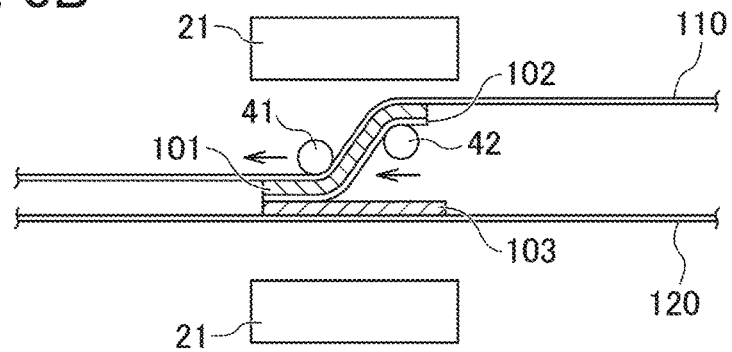
Figure 3C:
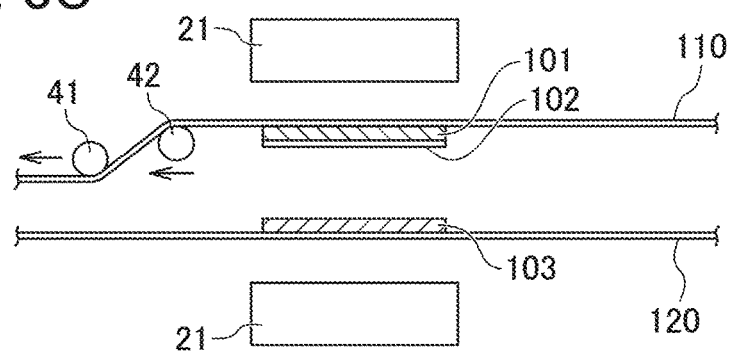

When the first peeling roll 41 further moves to the upstream side, the peeling proceeds continuously (refer to FIG. 3B). For this reason, the peeling proceeds without allowing the cathode electrode layer 103 to remain on the base material 102. The first peeling roll 41 passes through the back surface of the portion of the transport sheet 110 where the base material 102 is disposed, and the second peeling roll 42 passes between the base material 102 and the cathode electrode layer 103 from the downstream side in the transport direction toward the upstream side (refer to FIG. 3C). In this manner, the peeling device 40 peels the cathode electrode layer 103 from the base material 102.

The first peeling roll 41 and the second peeling roll 42 which peel the cathode electrode layer 103 from the base material 102 return to the downstream side after t3 seconds from the time when the transfer mold 21 is closed. At the same timing, the transport device 10 operates, so that the adhesive layer 101 and the base material 102 are transported to the downstream side together with the transport sheet 110.

Figure 3D:
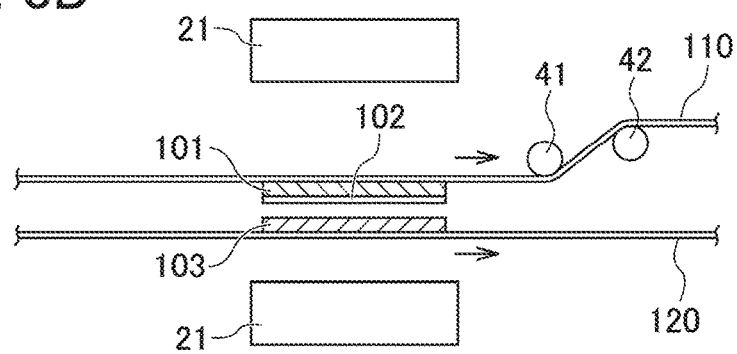

In addition, the electrolyte membrane transport device 50 operates, so that the cathode electrode layer 103 is transported to the downstream side together with the sheet-shaped electrolyte membrane 120 (refer to FIGS. 3D and 4). After that, an anode electrode is formed on the electrolyte membrane 120, so that the membrane electrode assembly of the fuel cell is obtained.

Subsequently, a method for manufacturing a membrane electrode assembly according to an embodiment of the present invention will be described. The method for manufacturing a membrane electrode assembly according to the embodiment is a method for manufacturing a membrane electrode assembly of a fuel cell including a pair of electrode layers and an electrolyte membrane. The method for manufacturing a membrane electrode assembly includes a transport step, a transfer step, a cooling step, and a peeling step.

The transport step is a step of transporting the base material 102 together with the transport sheet 110. In the embodiment, the transport step is a step of transporting the base material 102 on which the cathode electrode layer 103 is formed. In the transport step, the base material 102 is transported together with the transport sheet 110 toward the downstream side in the transport direction.

The base material 102 is connected to the transport sheet 110 via the adhesive layer 101. In addition, the cathode electrode layer 103 is formed on the surface of the base material 102 opposite to the adhesive layer 101.

The transfer step is a step of transferring the cathode electrode layer 103 to the electrolyte membrane 120. In the embodiment, the transfer step includes the transfer mold 21. By closing the transfer mold 21, the cathode electrode layer 103 is transferred to the sheet-shaped electrolyte membrane 120.

Specifically, the base material 102 is transported into the transfer mold 21 in an opened state by the transport device 10 (refer to FIG. 2A). Then, the transport device 10 is stopped, the transfer mold 21 is closed, and the cathode electrode layer 103 is heated and pressed for t1 second in the state of being interposed between the electrolyte membrane 120 and the transport sheet 110 (refer to FIGS. 2B and 4). Accordingly, the cathode electrode layer 103 is transferred to the electrolyte membrane 120.

Subsequently, the transfer mold 21 is opened, and a state in which the cathode electrode layer 103 is heated and pressed is released (refer to FIGS. 2C and 4). Herein, the time (t2−t1) from the start of opening of the transfer mold 21 in the closed state to the end of opening thereof is 1 to 10 seconds. In addition, immediately after the transfer mold 21 is opened, the cathode electrode layer 103 is transferred to the electrolyte membrane 120 and is also connected to the transport sheet 110 via the base material 102 and the adhesive layer 101 (refer to FIG. 2D). In addition, in the embodiment, the transport device 10 is stopped for a time period after the transfer mold 21 is closed until the transfer mold 21 is completely opened.

The cooling step is a step between the transfer step and the peeling step, in which the spraying device 31 sprays a cooling gas to the start point portion 105 for the peeling to perform cooling. In the embodiment, the cooling step includes a control step and a spraying step.

The control step is a step of controlling the timing at which the spraying device 31 sprays the cooling gas. The spraying step is a step in which the spraying device 31 is directed to the start point portion 105 for the peeling (the portion on the downstream side of the base material 102) and sprays the cooling gas at the controlled timing.

In the control step, the timing at which the spraying device 31 sprays the cooling gas is controlled such that the spraying device 31 starts spraying of the cooling gas when the transfer mold 21 starts to be opened, that is, after t1 second from the time when the transfer mold 21 is closed (refer to FIGS. 2C and 4) and the spraying device 31 stops spraying of the cooling gas when the opening of the transfer mold 21 is ended (the transfer mold is completely opened), that is, after t2 seconds from the time when the transfer mold 21 is closed (refer to FIGS. 2D and 4). In other words, the time period from the start of opening of the closed transfer mold 21 to the end of opening thereof coincides with the timing at which the spraying device 31 sprays the cooling gas to the start point portion 105 for the peeling.

As described above, in the embodiment, since the transport device 10 is stopped for a time period after the transfer mold 21 is closed until the transfer mold 21 is completely opened, and thus, the base material 102 does not move in the transport direction during the spraying step. Accordingly, without occurrence of a deviation from the directed position, the start point portion 105 for the peeling can be reliably cooled even for a short time period.

The peeling step is a step of peeling the cathode electrode layer 103 from the base material 102. In the embodiment, the peeling step is performed by operating the first peeling roll 41 and the second peeling roll 42.

When the transfer mold 21 is completely opened (that is, after t2 seconds from the time when the transfer mold 21 is closed), the first peeling roll 41 and the second peeling roll 42 move from the downstream side toward the upstream side in the transport direction (refer to FIG. 3A). When the first peeling roll 41 passes through the back surface of the portion where the start point portion 105 for the peeling of the transport sheet 110 is disposed, the start point portion 105 for the peeling is pulled toward the transport sheet 110 side and the electrolyte membrane 120 side, respectively. Herein, since the start point portion 105 for the peeling is cooled, the strength of the adhesive layer 101 exceeds the strength of the interface between the base material 102 and the cathode electrode layer 103. For this reason, the base material 102 and the cathode electrode layer 103 are peeled from the start point portion 105 for the peeling as a start point.

When the first peeling roll 41 further moves to the upstream side, the peeling proceeds continuously (refer to FIG. 3B). For this reason, the peeling proceeds without allowing the cathode electrode layer 103 to remain on the base material 102. The first peeling roll 41 passes through the back surface of the portion of the transport sheet 110 where the base material 102 is disposed, and the second peeling roll 42 passes between the base material 102 and the cathode electrode layer 103 from the downstream side in the transport direction toward the upstream side (refer to FIG. 3C). In this manner, the peeling step peels the cathode electrode layer 103 from the base material 102.

The first peeling roll 41 and the second peeling roll 42 which peel the cathode electrode layer 103 from the base material 102 return to the downstream side after t3 seconds from the time when the transfer mold 21 is closed. At the same timing, the transport device 10 operates, so that the adhesive layer 101 and the base material 102 are transported to the downstream side together with the transport sheet 110. In addition, the electrolyte membrane transport device 50 operates, so that the cathode electrode layer 103 is transported to the downstream side together with the sheet-shaped electrolyte membrane 120 (refer to FIGS. 3D and 4).

After that, an anode electrode is formed on the electrolyte membrane 120, so that the membrane electrode assembly of the fuel cell is obtained.

According to the method for manufacturing a membrane electrode assembly of the embodiment, the following effects are obtained.

(1) The method for manufacturing a membrane electrode assembly of the embodiment is a method for manufacturing a membrane electrode assembly of a fuel cell including a pair of electrode layers and an electrolyte membrane, the method including: a transport step of transporting a base material 102 connected to a transport sheet 110 via an adhesive layer 101 and having one cathode electrode layer 103 of the pair of electrode layers formed on a side opposite to the adhesive layer 101 together with the transport sheet 110; a transfer step of transferring the one cathode electrode layer 103 to the electrolyte membrane 120; and a peeling step of peeling the one cathode electrode layer 103 from the base material 102, in which a cooling step of performing cooling by spraying a cooling gas to a start point portion 105 for the peeling is included between the transfer step and the peeling step. In this manner, by spraying the cooling gas to the start point portion 105 for the peeling, the adhesive layer 101 is sufficiently cured, and thus, a strong adhesive force between the base material 102 and the transport sheet 110 can be obtained. Accordingly, the cathode electrode layer 103 can be continuously peeled from the base material 102 by using the start point portion 105 for the peeling as a start point. In addition, the cathode electrode layer 103 can be efficiently peeled from the base material 102 only by cooling the start point portion 105 for the peeling.

(2) In the transfer step, the one cathode electrode layer 103 is transferred to the electrolyte membrane 120 by closing the transfer mold 21, and in the cooling step, the spraying of the cooling gas is started when the transfer mold 21 starts to be opened. In this manner, when the transfer mold 21 starts to be opened, the cooling of the start point portion 105 for the peeling is started, so that the start point portion 105 for the peeling can be efficiently cooled.

(3) In the cooling step, the spraying of the cooling gas is stopped when the transfer mold 21 is completely opened. In this manner, since the spraying of the cooling gas is stopped when the transfer mold 21 is completely opened, it is possible to proceed to the peeling step immediately after the transfer step. That is, since there is no loss of time due to the cooling step, the cathode electrode layer 103 can be more efficiently peeled from the base material 102.

(4) In the peeling step, the one cathode electrode layer 103 is peeled from the base material 102 by rollers (the first peeling roll 41 and the second peeling roll 42) moving between the base material 102 and the one cathode electrode layer 103 from the downstream side toward the upstream side in the transport direction. In this manner, since the rollers move to perform the peeling step, the cathode electrode layer 103 can be more efficiently peeled from the base material 102.

Although an embodiment of the present invention has been described above, the present invention is not limited to the embodiment. For example, although the manufacturing apparatus 1 includes the peeling device 40 for peeling the transport sheet 110 and the base material 102 from the cathode electrode layer 103 has been described, the electrode layer may be not the cathode electrode layer 103 but the anode electrode layer. In this case, the manufacturing apparatus can efficiently peel the anode electrode layer from the base material 102.

EXPLANATION OF REFERENCE NUMERALS

1 MANUFACTURING APPARATUS
10 TRANSPORT DEVICE
20 TRANSFER DEVICE
30 COOLING DEVICE
31 SPRAYING DEVICE
40 PEELING DEVICE
101 ADHESIVE LAYER
102 BASE MATERIAL
103 CATHODE ELECTRODE LAYER
105 START POINT PORTION FOR PEELING
110 TRANSPORT SHEET

What is claimed is:

1. A method for manufacturing a membrane electrode assembly of a fuel cell including a pair of electrode layers and an electrolyte membrane, the method comprising:
    a transport step of transporting a base material connected to a transport sheet via an adhesive layer and having one electrode layer of the pair of electrode layers formed on a surface opposite to the adhesive layer together with the transport sheet;
    a transfer step of transferring the one electrode layer to the electrolyte membrane; and
    a peeling step of peeling the one electrode layer from the base material,
    wherein a cooling step of performing cooling by spraying a cooling gas to a start point portion for the peeling is included between the transfer step and the peeling step, and
    wherein movement of the base material to a downstream side in a transport direction is stopped from the transfer step to the cooling step.

2. The method for manufacturing a membrane electrode assembly according to claim 1, wherein, in the transfer step, the one electrode layer is transferred to the electrolyte membrane by closing a transfer mold, and
    in the cooling step, the spraying of the cooling gas is started when the transfer mold starts to be opened.

3. The method for manufacturing a membrane electrode assembly according to claim 2, wherein, in the cooling step, the spraying of the cooling gas is stopped when the transfer mold is completely opened.

4. The method for manufacturing a membrane electrode assembly according to claim 1, wherein, in the peeling step, the one electrode layer is peeled from the base material by rollers moving between the base material and the one electrode layer from a downstream side toward an upstream side in a transport direction.

* * * * *